(12) United States Patent
Kim (10) Patent No.: US 12,234,860 B2
(45) Date of Patent: Feb. 25, 2025

(54) FOIL AIR BEARING HAVING HERRINGBONE PATTERN

(71) Applicant: TNE KOREA CO., LTD., Cheongju-si (KR)

(72) Inventor: Kyeong Su Kim, Daejeon (KR)

(*) Notice: Subject to any disclaimer, the term of this patent is extended or adjusted under 35 U.S.C. 154(b) by 44 days.

(21) Appl. No.: 18/025,927

(22) PCT Filed: Oct. 12, 2021

(86) PCT No.: PCT/KR2021/013995
§ 371 (c)(1),
(2) Date: Mar. 13, 2023

(87) PCT Pub. No.: WO2022/080807
PCT Pub. Date: Apr. 21, 2022

(65) Prior Publication Data
US 2023/0366428 A1     Nov. 16, 2023

(30) Foreign Application Priority Data

Oct. 15, 2020   (KR) .................. 10-2020-0133722

(51) Int. Cl.
*F16C 17/02*     (2006.01)
*F16C 33/10*     (2006.01)

(52) U.S. Cl.
CPC ........ *F16C 17/024* (2013.01); *F16C 33/1015* (2013.01)

(58) Field of Classification Search
CPC .. F16C 17/024; F16C 33/1015; F16C 17/026; F16C 17/045; F16C 27/02
See application file for complete search history.

(56) References Cited

U.S. PATENT DOCUMENTS

2015/0362012 A1   12/2015   Ermilov
2020/0240464 A1*   7/2020   Lim ................. F16C 17/024

FOREIGN PATENT DOCUMENTS

| CN | 108050152 A | 5/2018 |
|---|---|---|
| CN | 108071665 A | 5/2018 |
| JP | S60-136615 A | 7/1985 |
| JP | S61-099721 U | 6/1986 |
| JP | H02-286908 A | 11/1990 |
| JP | 2004-108485 A | 4/2004 |

(Continued)

*Primary Examiner* — James Pilkington
*Assistant Examiner* — Aimee Tran Nguyen
(74) *Attorney, Agent, or Firm* — KORUS Patent, LLC; Seong Il Jeong (57) ABSTRACT

Provided is a foil air bearing having a herringbone pattern to sustain a load of a rotor rotating in a predetermined rotation direction around a center line, the foil air bearing including an upper top foil disposed to face a surface of the rotor, a middle top foil disposed under the upper top foil, a lower top foil disposed under the middle top foil, a bump foil provided as an elastically deformable member and disposed under the lower top foil, and a plurality of slots provided as holes penetrating from an upper surface to a lower surface of the middle top foil, and extending along a lengthwise direction forming a predetermined angle with a rotation direction of the rotor, wherein the upper top foil is deformed in a downward concave shape at locations corresponding to the slots due to air pressure generated by rotation of the rotor.

6 Claims, 12 Drawing Sheets

(56) References Cited

FOREIGN PATENT DOCUMENTS

| | | |
|---|---|---|
| JP | 2005-030460 A | 2/2005 |
| JP | 2012-193833 A | 10/2012 |
| KR | 10-1508975 B1 | 4/2015 |
| KR | 10-1558490 B1 | 10/2015 |
| KR | 10-2017-0089281 A | 8/2017 |
| KR | 10-1785291 B1 | 10/2017 |
| KR | 10-2018-0018178 A | 2/2018 |
| WO | WO-2014070046 A1 * | 5/2014 ............ F16C 17/024 |

* cited by examiner

FOIL AIR BEARING HAVING HERRINGBONE PATTERN

TECHNICAL FIELD

The present invention relates to a foil air bearing and, more particularly, to a foil air bearing capable of easily forming a herringbone pattern satisfying design requirements and of reducing an overall manufacturing cost by forming slots through pressing without using etching or welding.

BACKGROUND ART

Air bearings are bearings for sustaining a load by lifting a rotor by using the pressure of compressed air between the rotor and the bearing.

The air bearings use a principle that, when a viscous gas such as air moves along with a moving surface and then is compressed upon meeting a stationary surface, the pressure of the air trapped between the moving surface and the stationary surface is increased to lift the moving surface.

The air bearings include thrust air bearings for sustaining a load applied along a lengthwise direction of a rotor, and journal air bearings for sustaining a load applied along a radius direction of a rotor.

As a type of the journal air bearings, journal foil air bearings use thin foils to easily generate pressure and increase dynamic stability at high speed.

Figure 12:
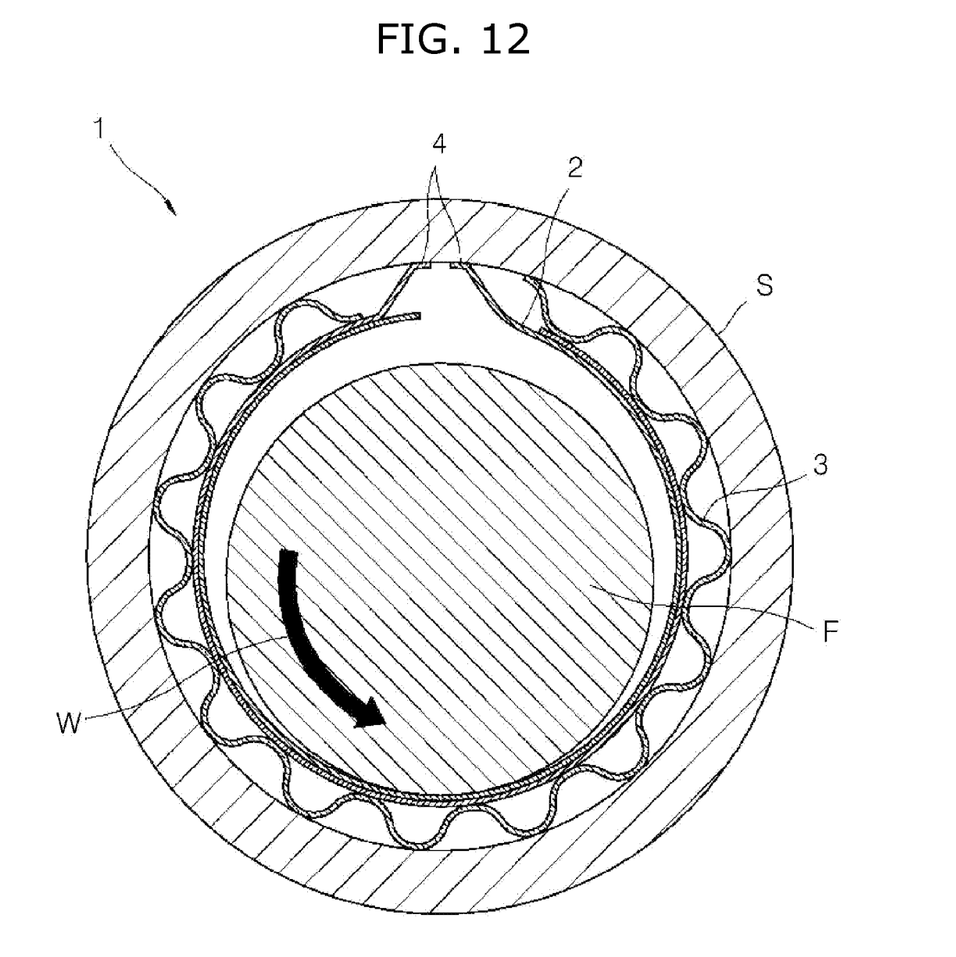
FIG. 12 is a cross-sectional view of an existing journal foil air bearing.

FIG. 12 illustrates an example of a journal foil air bearing 1. The journal foil air bearing 1 includes a top foil 2 disposed to face an outer circumferential surface of a rotor F having a circular rotating shaft shape rotating in a predetermined rotation direction W, and surrounding the rotor F, and a bump foil 3 provided as an elastically deformable wave-shaped member and disposed to surround the top foil 2, and one ends of the top foil 2 and the bump foil 3 are welded to a welded portion 4 inside a bearing housing S.

Figure 15:
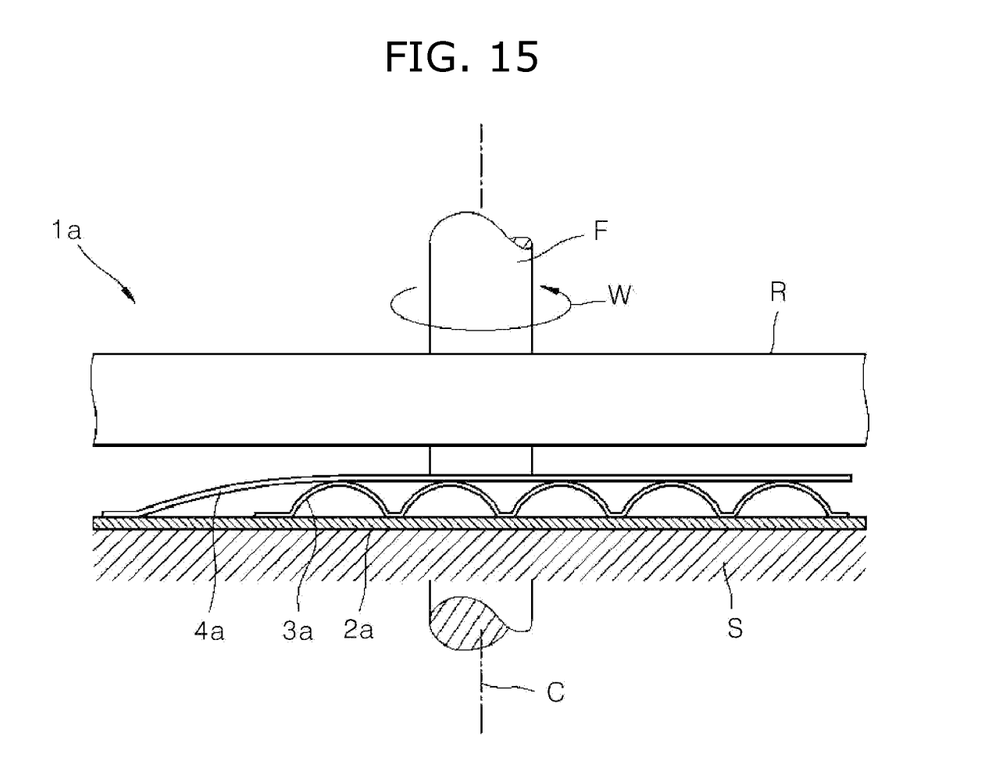
FIG. 15 is a cross-sectional view of an existing thrust foil air bearing.

Meanwhile, as shown in FIG. 15, an existing thrust foil air bearing 1a includes a lower plate 2a provided as a plate-shaped member coupled to a stopper S, a bump foil 3a disposed on an upper surface of the lower plate 2a and being elastically deformable, and a top foil 4a disposed on the bump foil 3a and being contactable with a rotor R having a circular rotating plate shape. Herein, the rotor R is coupled to a rotor F having a circular rotating shaft shape rotating in a predetermined rotation direction W around a center line C.

Figure 13:
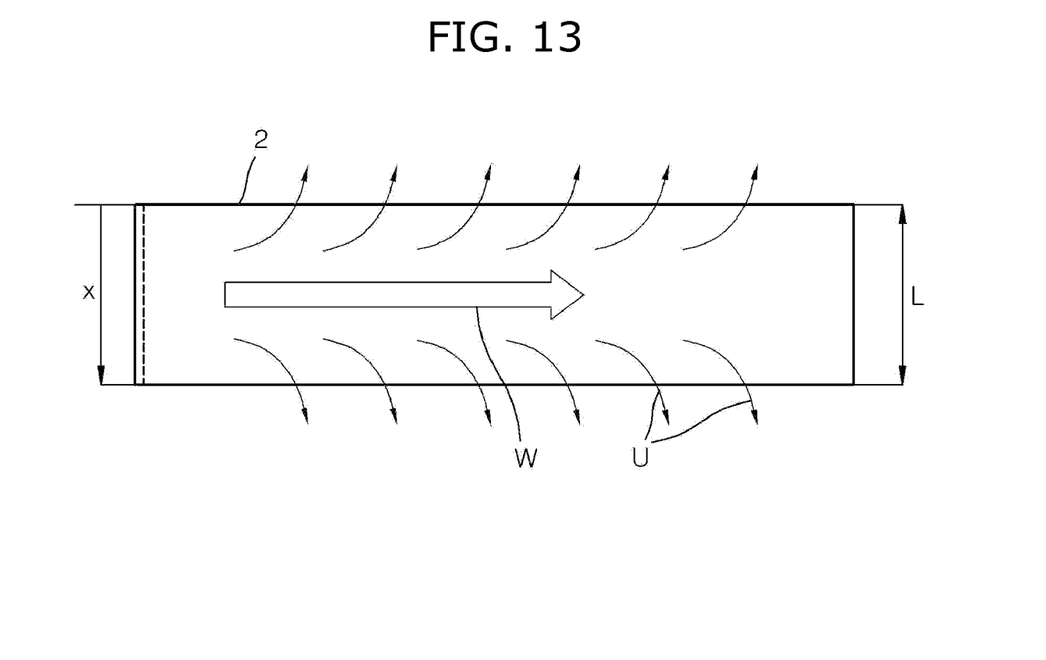
FIG. 13 is a development view for describing that air pressure is reduced due to outflows generated toward both sides on a top foil of the journal foil air bearing illustrated in FIG. 12.

The air bearing 1 or 1a lifts the rotor F or R in a non-contact manner by using a pressure generated inside the bearing due to a rotation speed of the rotor F or R and, in this case, the value of the pressure generated inside the bearing is reduced due to outflows U generated toward both sides of the bearing as shown in FIG. 13. Herein, FIG. 13 is a development view of the top foil 2 of the journal foil air bearing 1 when unrolled in the rotation direction W.

Figure 14:
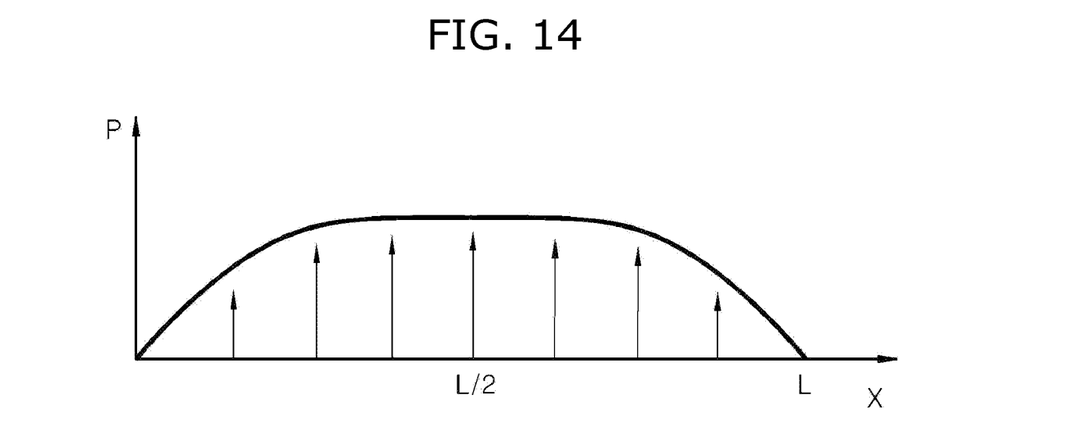
FIG. 14 is a graph showing the distribution of air pressure inside the journal foil air bearing illustrated in FIG. 12.

The pressure leakage, which occurs at ends (e.g., x=0 and x=L) of the bearing as shown in FIG. 14, reduces the pressure inside the bearing and consequently reduces the load capacity and the performance of the bearing. Herein, FIG. 14 is a graph showing the distribution of air pressure inside the journal foil air bearing 1 based on a location in a widthwise direction (e.g., x direction) of the top foil 2 of the journal foil air bearing 1 when the top foil 2 is unrolled in the rotation direction W.

Figure 6:
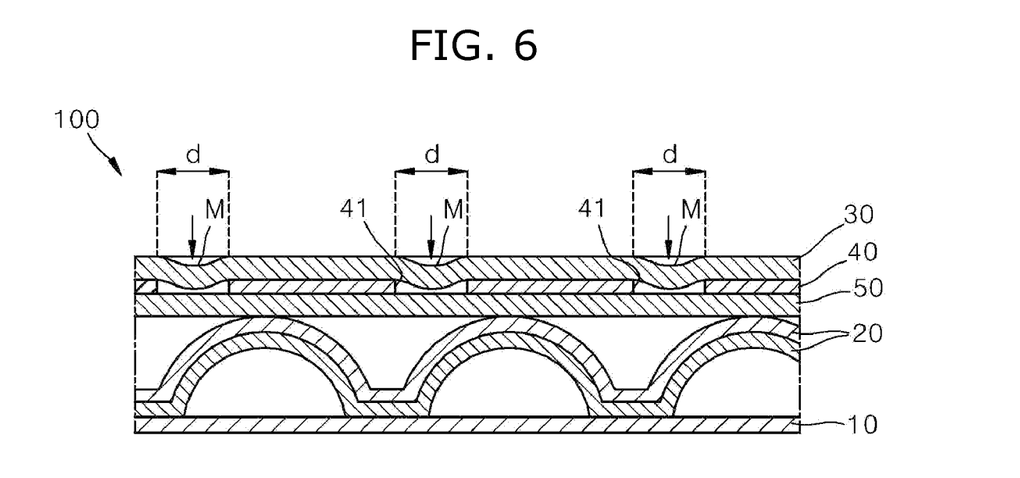
FIG. 6 is a cross-sectional view taken along line VI-VI of FIG. 5.
Figure 7:
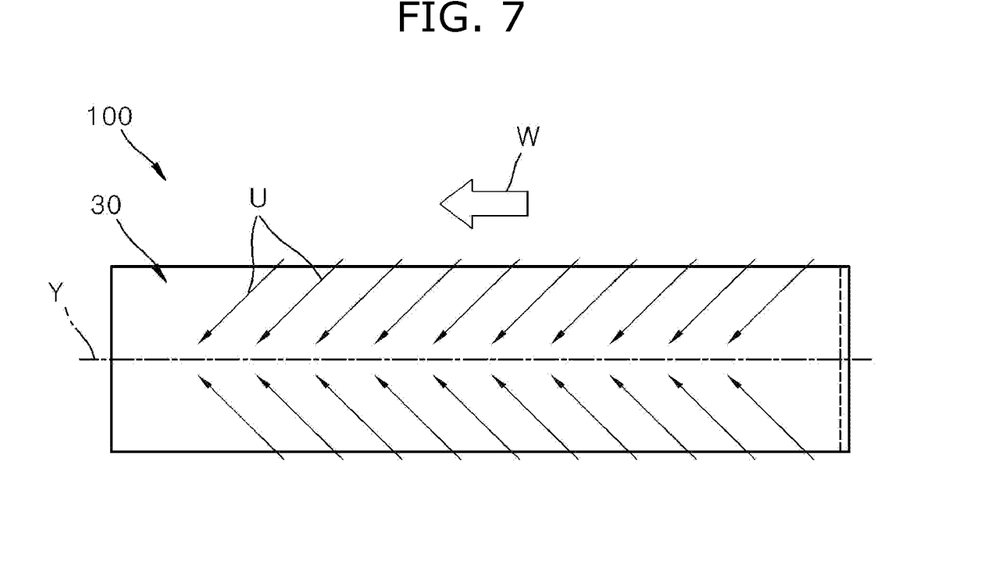
FIG. 7 is a development view showing that a herringbone effect occurs due to inflows generated on a top foil of the journal foil air bearing illustrated in FIG. 1.

To solve the above problems, U.S. Patent Publication No. 20150362012, published on Dec. 17, 2015, discloses a foil air bearing having a herringbone effect to generate inflows U on an upper surface of a top foil as shown in FIG. 7, by inserting an additional foil between the top foil and a bump foil, forming grooves with bottoms by etching or machining an upper surface of the additional foil, and deforming the upper surface of the top foil as shown in FIG. 6 due to air pressure to form a so-called herringbone pattern.

However, according to the existing foil air bearing, because the etching or machining process for forming the grooves on the upper surface of the additional foil is technically very difficult, an overall manufacturing cost is increased and product quality is reduced.

In addition, according to the existing foil air bearing, because the grooves with bottoms are formed on the additional foil, when the grooves do not have a sufficient depth, the bottoms of the grooves prevent deformation of the top foil and thus the herringbone pattern is not formed to satisfy design requirements.

DETAILED DESCRIPTION OF THE INVENTION

Technical Problem

The present invention provides a foil air bearing capable of easily forming a herringbone pattern satisfying design requirements and of reducing an overall manufacturing cost by forming slots through pressing without using etching or welding.

Technical Solution

According to an aspect of the present invention, there is provided a foil air bearing for sustaining a load of a rotor rotating in a predetermined rotation direction around a center line, the foil air bearing including an upper top foil disposed to face a surface of the rotor, a middle top foil disposed under the upper top foil, a lower top foil disposed under the middle top foil, a bump foil provided as an elastically deformable member and disposed under the lower top foil, and a plurality of slots provided as holes penetrating from an upper surface to a lower surface of the middle top foil, and extending along a lengthwise direction forming a predetermined angle with a rotation direction of the rotor, wherein the upper top foil is deformed in a downward concave shape at locations corresponding to the slots due to air pressure generated by rotation of the rotor, so as to form a herringbone pattern.

The plurality of slots may be spaced apart from each other by a predetermined distance and symmetrically disposed with respect to an imaginary line of symmetry parallel to the rotation direction.

The top foils and the bump foil may have a shape that is mass-producible by being automatically cut and bent through pressing without using etching or welding.

A lower surface of the middle top foil and an upper surface of the lower top foil may be stacked on one another in a separable state.

The foil air bearing may include a journal foil air bearing in which the rotor is provided in a form of a rotating shaft, and the journal foil air bearing may include a base foil disposed to surround the bump foil, and a coupler for coupling one ends of the plurality of top foils, one end of the bump foil, and both ends of the base foil to each other.

The foil air bearing may include a journal foil air bearing in which the rotor is provided in a form of a rotating shaft, and at a location where the rotor is close to the upper top foil while the rotor is rotating, the slots may be provided more densely compared to other locations.

The foil air bearing may include a thrust foil air bearing in which the rotor is provided in a form of a rotating plate, the middle top foil may be provided in a form of a circular plate, and the slots may be arranged along an imaginary circle having the center line as a center of the circle.

Advantageous Effects

According to the present invention, a foil air bearing for sustaining a load of a rotor rotating in a predetermined rotation direction around a center line includes an upper top foil disposed to face a surface of the rotor, a middle top foil disposed under the upper top foil, a lower top foil disposed under the middle top foil, a bump foil provided as an elastically deformable member and disposed under the lower top foil, and a plurality of slots provided as holes penetrating from an upper surface to a lower surface of the middle top foil, and extending along a lengthwise direction forming a predetermined angle with a rotation direction of the rotor, wherein the upper top foil is deformed in a downward concave shape at locations corresponding to the slots due to air pressure generated by rotation of the rotor, so as to form a herringbone pattern. As such, a herringbone pattern satisfying design requirements may be easily formed and an overall manufacturing cost may be reduced by forming the slots through pressing without using etching or welding.

BEST MODE

Hereinafter, the present invention will be described in detail by explaining embodiments of the invention with reference to the attached drawings.

Figure 1:
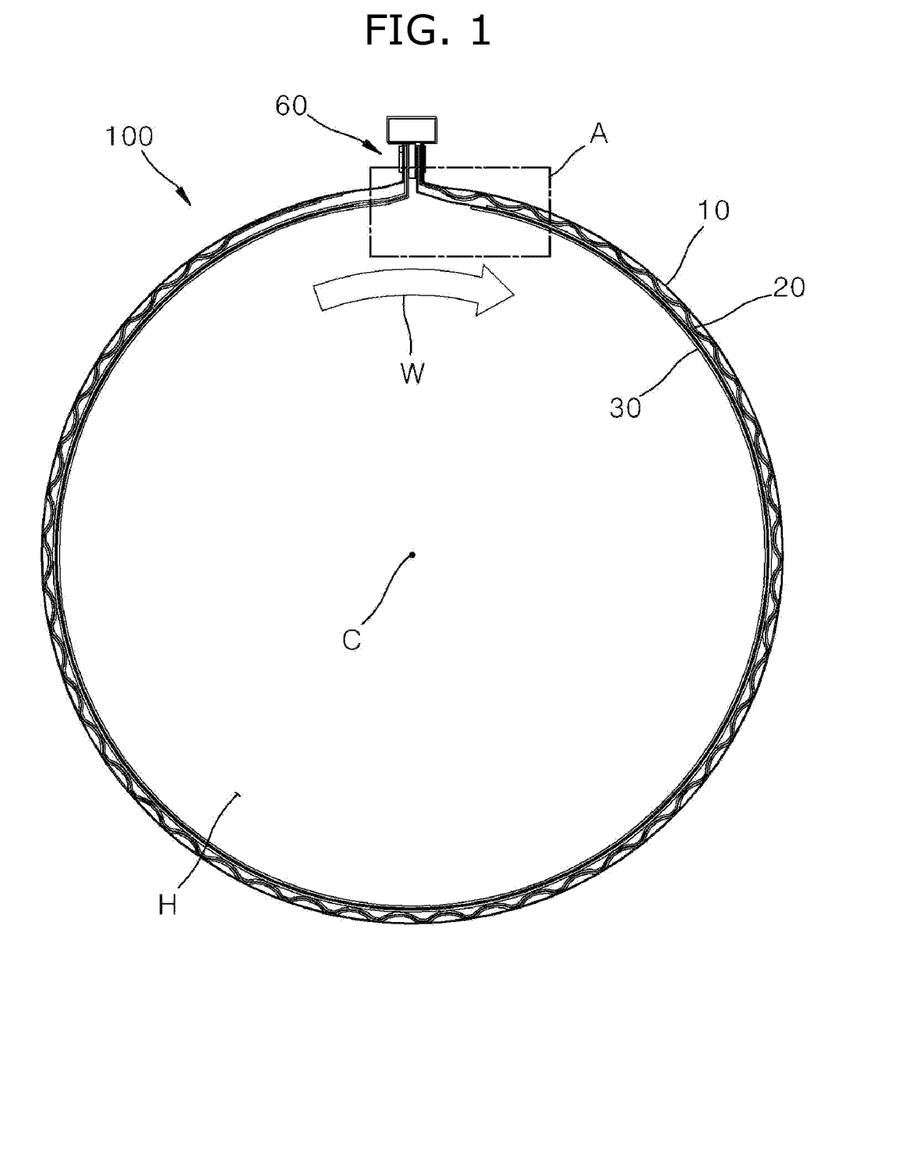
FIG. 1 is a cross-sectional view of a journal foil air bearing according to an embodiment of the present invention.
Figure 2:
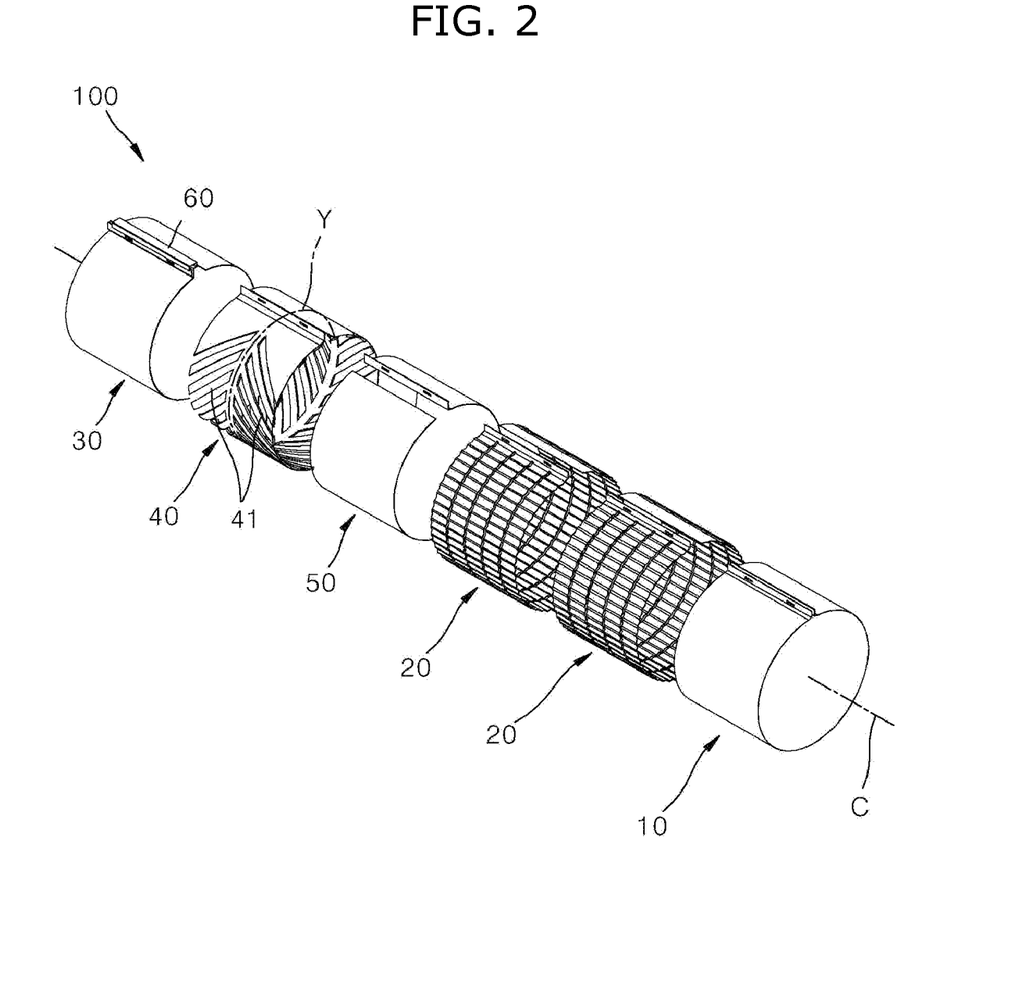
FIG. 2 is an exploded perspective view of the journal foil air bearing illustrated in FIG. 1.
Figure 3:
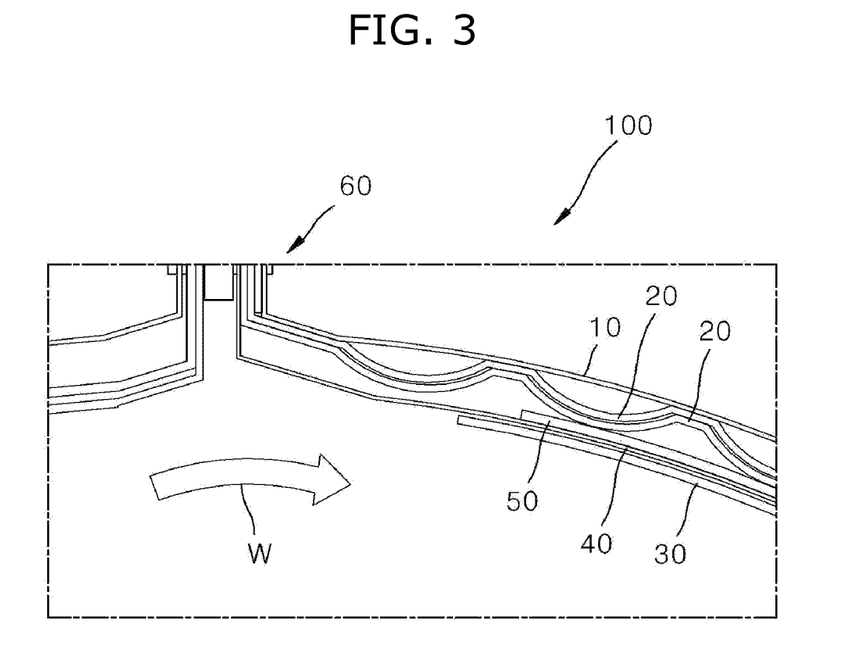
FIG. 3 is an enlarged view of portion A of FIG. 1.

FIG. 1 is a cross-sectional view of a journal foil air bearing 100 according to an embodiment of the present invention, and FIG. 2 is an exploded perspective view of the journal foil air bearing 100 illustrated in FIG. 1. FIG. 3 is an enlarged view of portion A illustrated in FIG. 1.

Referring to FIGS. 1 to 3, the journal foil air bearing 100 according to an embodiment of the present invention is a journal foil air bearing for sustaining a load applied along a radius direction of a rotor provided in the form of a rotating shaft F having a circular cross-section as shown in FIG. 12, and includes a base foil 10, a bump foil 20, an upper top foil 30, a middle top foil 40, a lower top foil 50, and a coupler 60. The following description assumes that the rotor rotates in a predetermined rotation direction W around a center line C shown in FIG. 1.

The base foil 10 is a circular pipe member formed by pressing a flexible and elastic metal sheet as shown in FIG. 2.

In the current embodiment, the base foil 10 is made in the form of a pipe having a "C"-shaped cross-section, by rolling a pressed rectangular metal sheet around the center line C.

The base foil 10 is a circular pipe member extending by a predetermined length along the center line C, and includes a hollow H having the center line C as the center of a circle.

The base foil 10 is disposed to surround the bump foil 20 to be described below, such that the bump foil 20 is accommodated in the hollow H of the base foil 10.

Both ends of the base foil 10 are bent in an "L" shape and protrude upward as shown in FIG. 3, so as to be couplable to the coupler 60.

The bump foil 20 is a circular pipe member formed by pressing a flexible and elastic metal sheet as shown in FIG. 2.

The bump foil 20 is a circular pipe member extending by a predetermined length along the center line C, and includes a hollow H having the center line C as the center of a circle.

In the current embodiment, the bump foil 20 is made in the form of a pipe having a "C"-shaped cross-section, by rolling a pressed rectangular metal sheet around the center line C.

The bump foil 20 is disposed to surround the lower top foil 50 while being accommodated in the hollow H of the base foil 10.

The bump foil 20 includes a wave-shaped portion in which a plurality of peaks and valleys are connected alternately, so as to be elastically deformable in a radius direction of the center line C.

A right end of the bump foil 20 is bent in an "L" shape and protrudes upward as shown in FIG. 3, so as to be couplable to the coupler 60.

A left end of the bump foil 20 is a free end that may move freely as shown in FIG. 1.

In the current embodiment, a pair of bump foils 20 are provided and stacked on one another as shown in FIG. 3.

The upper top foil 30 is a circular pipe member formed by pressing a flexible and elastic metal sheet as shown in FIG. 2, and is disposed at the innermost side as shown in FIG. 3 so as to face an outer circumferential surface of the rotating shaft F.

The upper top foil 30 is a circular pipe member extending by a predetermined length along the center line C, and includes a hollow H having the center line C as the center of a circle.

In the current embodiment, each of the upper top foil 30, the middle top foil 40, and the lower top foil 50 is made in the form of a pipe having a "C"-shaped cross-section, by rolling a pressed rectangular metal sheet around the center line C.

The upper top foil 30 is disposed to surround the rotating shaft F while being accommodated in the hollow H of the bump foil 20.

At a left end of the upper top foil 30, the coupler 60 bent in a "∩" shape is provided.

A right end of the upper top foil 30 is a free end that may move freely as shown in FIG. 3.

A surface of the upper top foil 30 facing the outer circumferential surface of the rotating shaft F is coated with a coating material (not shown) including polytetrafluoroethylene (PTFE). PTFE is also called Teflon.

Figure 5:
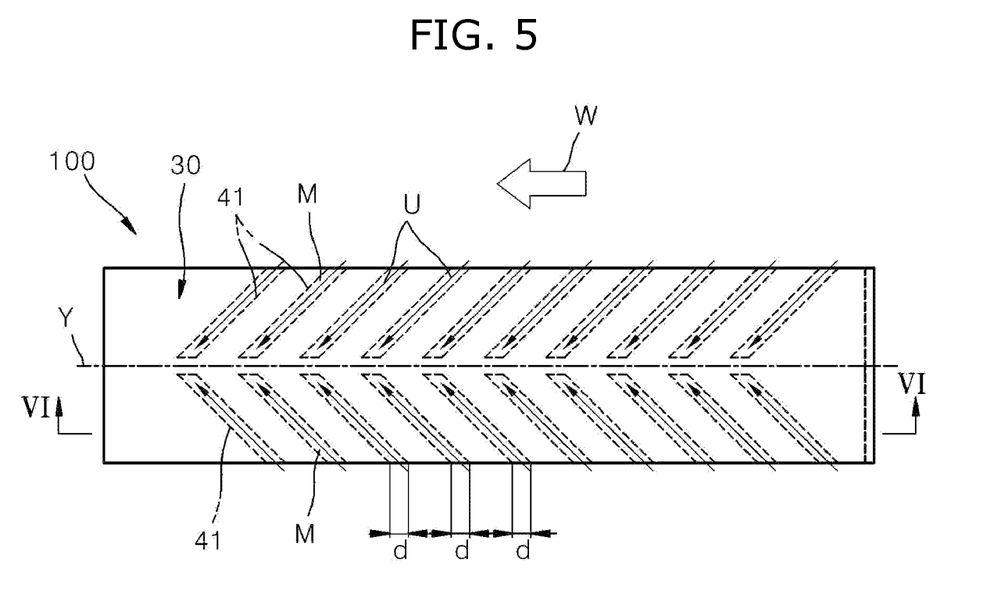
FIG. 5 is a development view of the journal foil air bearing illustrated in FIG. 1.

The upper top foil 30 has a material and thickness capable of deforming the upper top foil 30 in a downward concave shape at locations corresponding to slots 41 as shown in FIG. 6 due to air pressure generated by the rotation of the rotating shaft F, so as to form a herringbone pattern having a plurality of air guide grooves M as shown in FIG. 5.

When the thickness of the upper top foil 30 has an excessively large value, the herringbone pattern may not be formed to a sufficient depth.

Like the upper top foil 30, the middle top foil 40 is a circular pipe member extending by a predetermined length along the center line C, and includes a hollow H having the center line C as the center of a circle.

The middle top foil 40 is disposed to surround the upper top foil 30 while being accommodated in a hollow H of the lower top foil 50 to be described below.

A right end of the middle top foil 40 is bent in an "L" shape and protrudes upward as shown in FIG. 3, so as to be couplable to the coupler 60.

A left end of the middle top foil 40 is a free end that may move freely as shown in FIG. 3.

Figure 4:
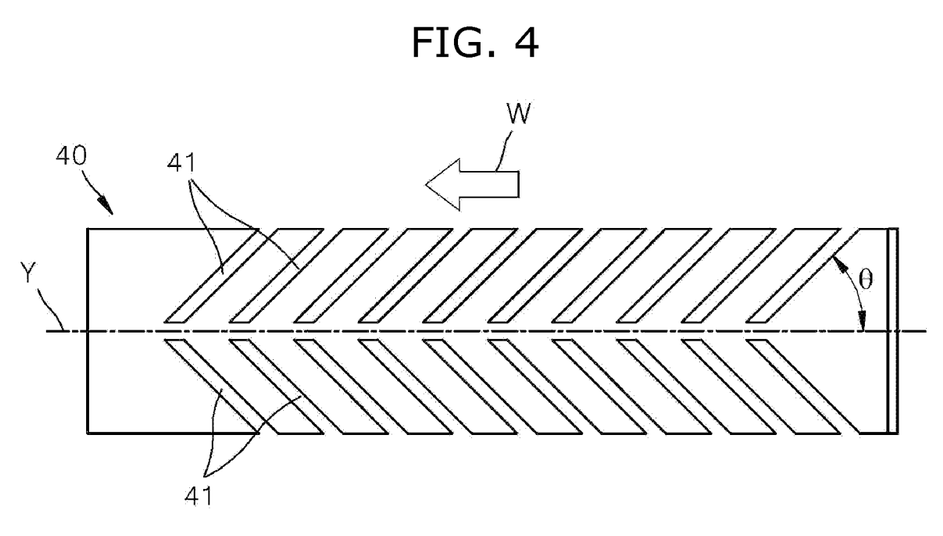
FIG. 4 is a development view of a middle top foil illustrated in FIG. 2.

In the middle top foil 40, a plurality of slots 41 are provided as shown in FIG. 4.

The slots 41 are holes penetrating from an upper surface to a lower surface of the middle top foil 40, and are symmetrically disposed with respect to an imaginary line of symmetry Y parallel to the rotation direction W of the rotating shaft F as shown in FIG. 4.

The slots 41 are strip-shaped holes having a planar parallelogram shape as shown in FIG. 4, having a certain width d as shown in FIG. 5, and extending along a lengthwise direction.

The slots 41 extend along the lengthwise direction forming a predetermined angle θ with the line of symmetry Y parallel to the rotation direction W of the rotating shaft F.

The angle θ is an acute angle less than 90°, and a value thereof may be changed when necessary. In the current embodiment, the angle θ is 45°.

The plurality of slots 41 are spaced apart from each other by a predetermined distance along the line of symmetry Y.

Eventually, the middle top foil 40 has a herringbone pattern as shown in FIG. 4 due to the slots 41.

Herein, the herringbone is a word meaning 'the bones of a fish called herring', and the herringbone pattern refers to a design or pattern in which a plurality of fish bone shapes or arrow shapes are arranged next to each other.

The middle top foil 40 may be processed through wire cutting, punching, or water jet cutting.

In the current embodiment, the middle top foil 40 has a thickness less than or equal to 0.2 mm.

Figure 8:
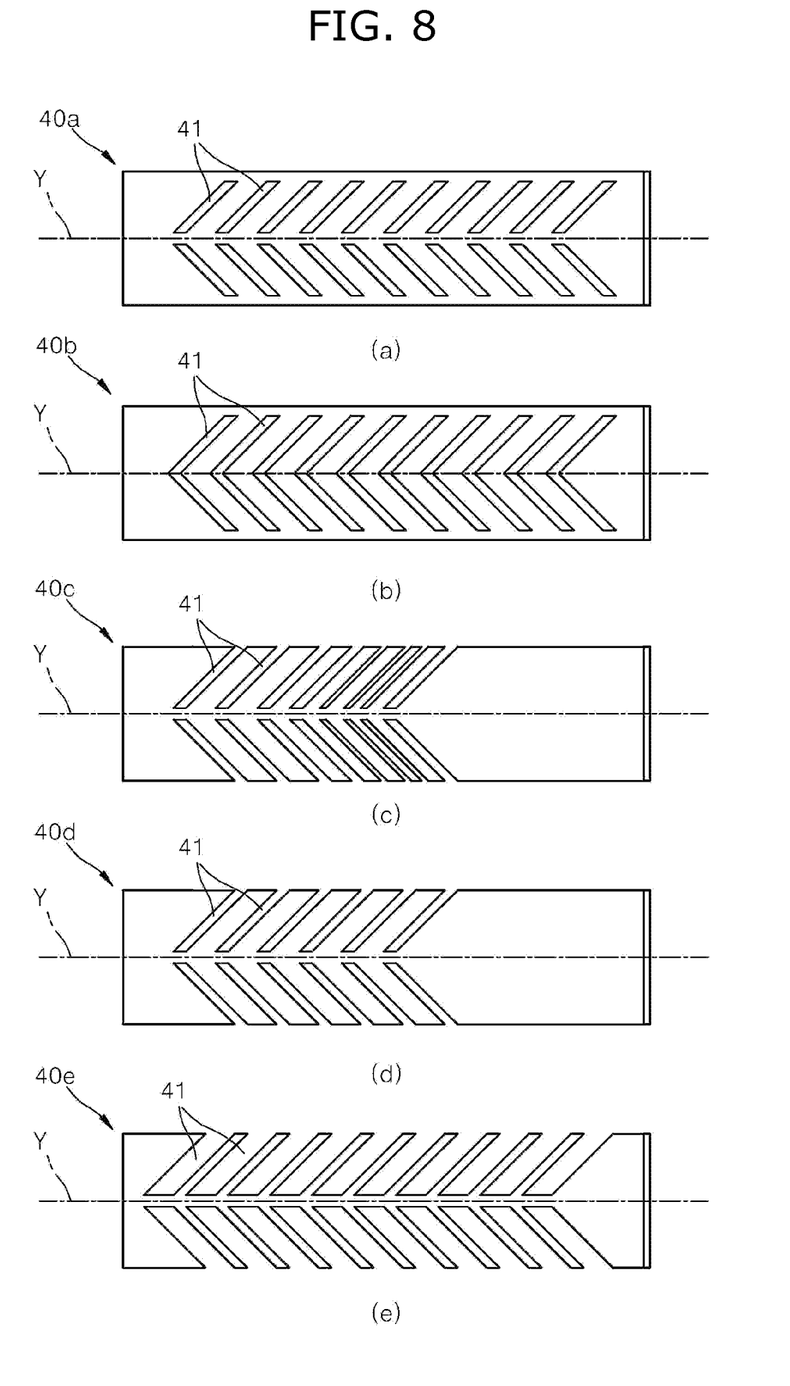
FIG. 8 illustrates various types of middle top foils.

Meanwhile, FIG. 8 illustrates middle top foils 40a to 40e having various herringbone patterns.

The middle top foils 40a and 40b include the slots 41 having closed ends, and the middle top foils 40c, 40d, and 40e include the slots 41 having open ends.

Particularly, the middle top foil 40c has a shape in which the slots 41 of a certain portion have a width d less than that of the other slots 41 and a distance between the slots 41 of the certain portion is less that that between the other slots 41.

Generally, in the journal foil air bearing 100, when the rotating shaft F rotates, a distance between the rotating shaft F and the upper top foil 30 varies depending on a location as shown in FIG. 12. That is, a lower portion of the rotating shaft F is very close to the upper top foil 30, and an upper portion of the rotating shaft F is very far from the upper top foil 30.

Therefore, when the middle top foil 40c is used, at a location where the rotating shaft F is relatively close to the upper top foil 30, i.e., at a middle portion of the middle top foil 40c of FIG. 8, the slots 41 may be provided more densely or be more closely spaced apart from each other to have a less width d of the slots 41 and a less distance between the slots 41 compared to other locations. As such, a lubrication effect may be improved by increasing air inflows U at the lower portion of the rotating shaft F.

In the current embodiment, the middle top foil 40 has a structure similar to the middle top foil 40d illustrated in FIG. 8.

The slots 41 may be provided over the entire length of the middle top foil 40 as shown in FIG. 4, or provided over only a partial length as in the middle top foils 40c and 40d of FIG. 8.

Like the upper top foil 30, the lower top foil 50 is a circular pipe member extending by a predetermined length along the center line C, and includes a hollow H having the center line C as the center of a circle.

The lower top foil 50 is disposed to surround the middle top foil 40 while being accommodated in the hollow H of the bump foil 20.

A left end of the lower top foil 50 is bent in an "L" shape and protrudes upward as shown in FIG. 3, so as to be couplable to the coupler 60.

A right end of the lower top foil 50 is a free end that may move freely as shown in FIG. 3.

A thickness of the lower top foil 50 may be greater than the thickness of the middle top foil 40 because the lower top foil 50 serves to support the middle top foil 40.

In the current embodiment, a lower surface of the middle top foil 40 and an upper surface of the lower top foil 50 are not bonded to each other through welding or the like, and are merely stacked on one another in a separable state.

Therefore, as shown in a cross-sectional view of the journal foil air bearing 100 of FIG. 6, a stacked structure in which the middle top foil 40 is disposed under the upper top foil 30, the lower top foil 50 is disposed under the middle top foil 40, the bump foil is disposed under the lower top foil 50, and the base foil 10 is disposed under the bump foil 20 is formed.

The base foil 10, the bump foil 20, and the top foils 30, 40, and 50 may be formed using metal sheets made of the same material, and have different thicknesses.

In the current embodiment, the top foils 30, 40, and 50, the bump foil 20, and the base foil 10 have a shape that is mass-producible by being automatically cut and bent through pressing without using etching or welding.

The coupler 60 is a portion for coupling one ends of the plurality of top foils 30, 40, and 50, one end of the bump foil 20, and both ends of the base foil 10 to each other as shown in FIG. 3.

Although not shown in detail, as shown in FIG. 3, the coupler 60 includes coupling holes (not shown) provided in both ends of the base foil 10 and one ends of the bump foil 20 and the top foils 30, 40, and 50, and a coupling member (not shown) fixed through the coupling holes (not shown).

In the current embodiment, the coupling member (not shown) is a "⊂"-shaped sheet member which is inserted into the coupling holes (not shown) and then bent at both ends and plastically deformed to fix the top foils 30, 40, and 50, the bump foil 20, and the base foil 10 to each other.

An example of the operational principle of the above-described journal foil air bearing 100 will now be described.

Initially, when the rotating shaft F starts to rotate, portions of the upper top foil 30 are deformed in a downward concave shape as shown in FIG. 6 due to air pressure generated by the rotation of the rotating shaft F, and thus a herringbone pattern having a plurality of air guide grooves M is formed on an upper surface of the upper top foil 30 as shown in FIG. 5.

When the air guide grooves M are formed as described above, air inflows U are generated from both sides of the upper top foil 30 diagonally toward the line of symmetry Y in the middle on the upper surface of the upper top foil 30 as shown in FIG. 7, and thus a herringbone effect that prevents pressure leakage from both sides of the bearing occurs as shown in FIG. 14.

The above-described journal foil air bearing 100 is a foil air bearing for sustaining a load of the rotor F rotating in a predetermined rotation direction around the center line C, and includes the upper top foil 30 disposed to face a surface of the rotor F, the middle top foil 40 disposed under the upper top foil 30, the lower top foil 50 disposed under the middle top foil 40, the bump foil 20 provided as an elastically deformable member and disposed under the lower top foil 50, and the plurality of slots 41 provided as holes penetrating from an upper surface to a lower surface of the middle top foil 40, and extending along a lengthwise direction forming the predetermined angle θ with the rotation direction W of the rotor F, wherein the upper top foil 30 is deformed in a downward concave shape at locations corresponding to the slots 41 due to air pressure generated by the rotation of the rotor F, so as to form a herringbone pattern. As such, a herringbone pattern satisfying design requirements may be easily formed and an overall manufacturing cost may be reduced by forming the slots 41 through pressing without using etching or welding.

According to the journal foil air bearing 100, because the plurality of slots 41 are spaced apart from each other by a predetermined distance and symmetrically disposed with respect to the imaginary line of symmetry Y parallel to the rotation direction W, pressure leakage from both sides of the bearing may be reduced and thus the load capacity and the performance of the bearing may be increased.

According to the journal foil air bearing 100, because the top foils 30, 40, and 50 and the bump foil 20 have a shape that is mass-producible by being automatically cut and bent through pressing without using etching or welding, an overall manufacturing cost and manufacturing time may be reduced.

According to the journal foil air bearing 100, because a lower surface of the middle top foil 40 and an upper surface of the lower top foil 50 are stacked on one another in a separable state, unlike a general journal foil air bearing including grooves with bottoms, the middle top foil 40 may be selectively repaired or replaced after long time use.

According to the journal foil air bearing 100, because the coupler 60 for coupling one ends of the plurality of top foils 30, 40, and 50, one end of the bump foil 20, and both ends of the base foil 10 to each other is included, the journal foil air bearing 100 may be provided as a "modularized" bearing which may be simply inserted into a bearing housing.

In the current embodiment, the coupler 60 includes the coupling member (not shown) provided as a "⊂"-shaped sheet member, and the coupling holes (not shown) provided in both ends of the base foil 10 and one ends of the bump foil 20 and the top foils 30, 40, and 50, but may also include an arbitrary coupling device.

Figure 9:
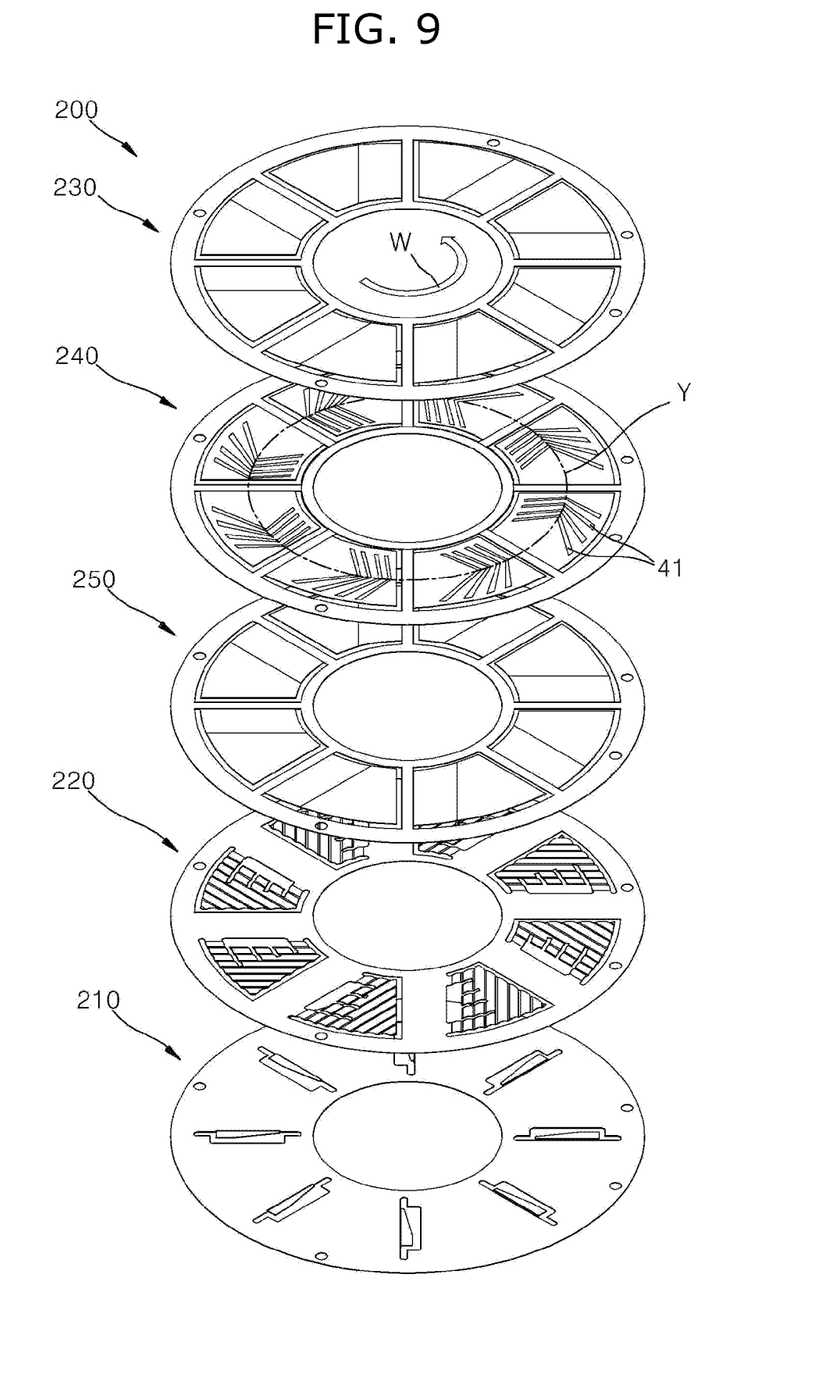
FIG. 9 is an exploded perspective view of a thrust foil air bearing according to another embodiment of the present invention.
Figure 10:
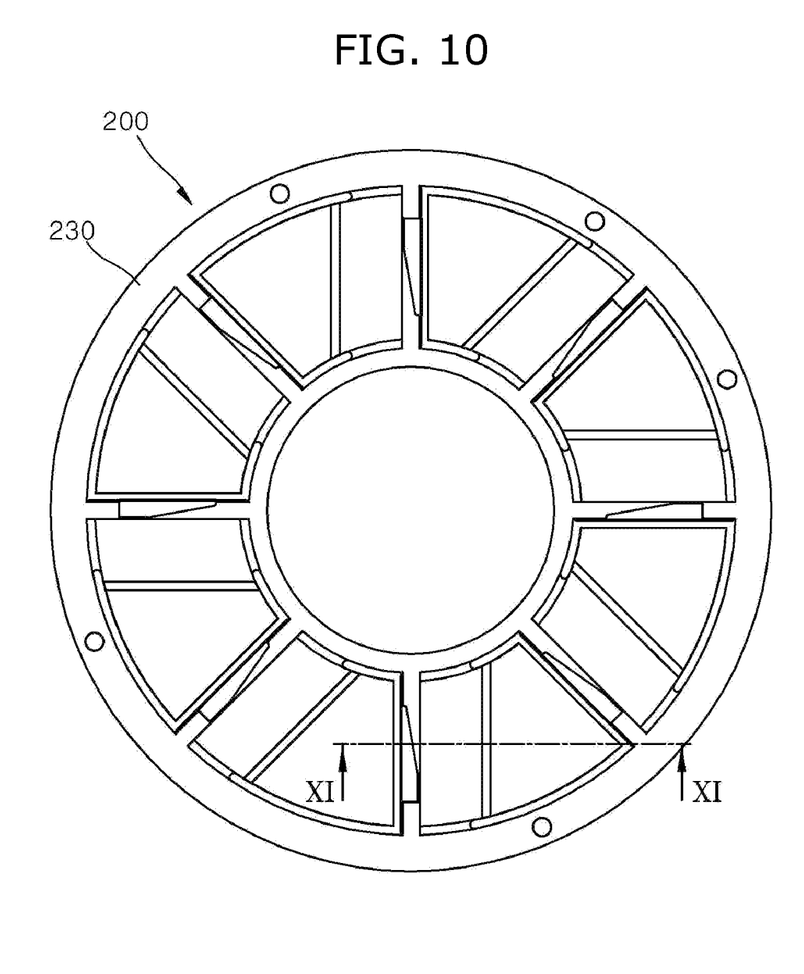
FIG. 10 is a plan view of the thrust foil air bearing illustrated in FIG. 9.

Meanwhile, FIG. 9 illustrates a thrust foil air bearing 200 according to another embodiment of the present invention. The thrust foil air bearing 200 is a thrust foil air bearing in which a rotor rotating around the center line C is provided in the form of a circular rotating plate R as shown in FIG. 15, and includes a base foil 210, a bump foil 220, an upper top foil 230, a middle top foil 240, and a lower top foil 250.

The configurations and effects of the thrust foil air bearing 200 and the journal foil air bearing 100 are mostly similar, and thus only differences between the two will now be described.

The thrust foil air bearing 200 differs from the journal foil air bearing 100 in that the foils 210, 220, 230, 240, and 250 are provided in the form of a circular plate having a hollow.

The thrust foil air bearing 200 also differs from the journal foil air bearing 100 in that the middle top foil 240 is provided in the form of a circular plate and the slots 41 are arranged along an imaginary circle Y having the center line C as the center of the circle.

Figure 11:
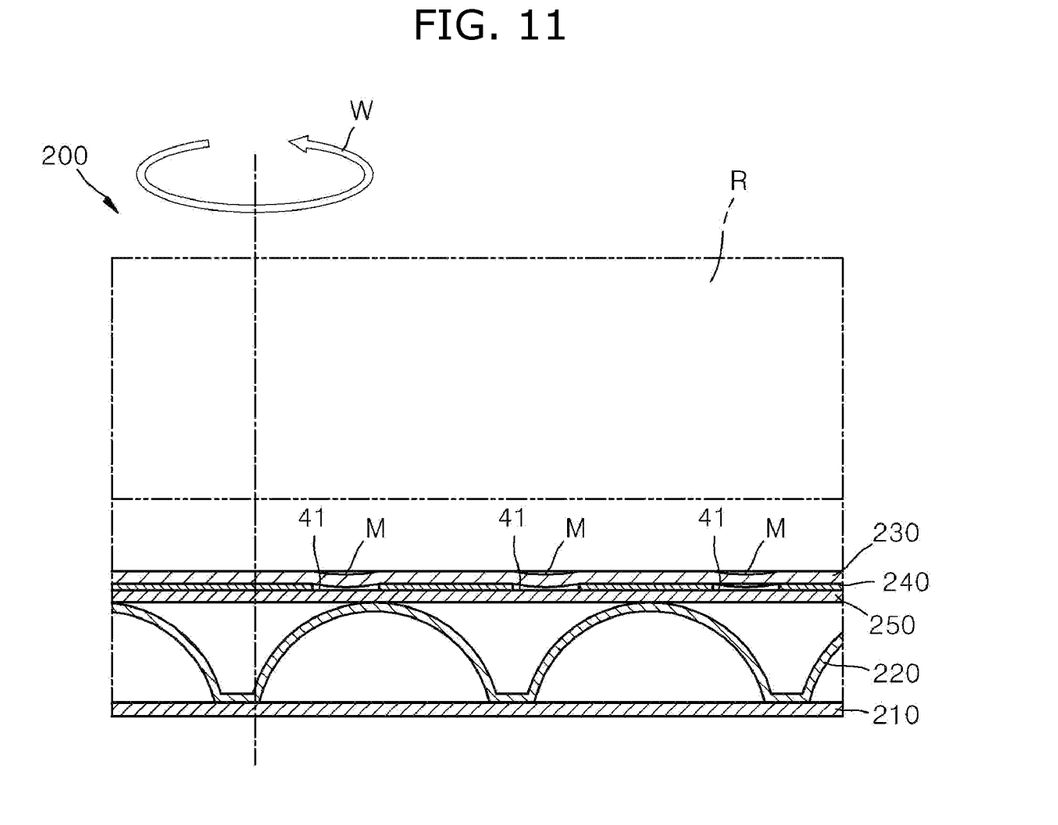
FIG. 11 is a cross-sectional view taken along line XI-XI of FIG. 10.

However, as shown in FIG. 11, a cross-sectional structure of the thrust foil air bearing 200 is almost the same as the cross-sectional structure of the journal foil air bearing 100 shown in FIG. 6.

Therefore, according to the thrust foil air bearing 200, the upper top foil 230 may be deformed in a downward concave shape at locations corresponding to the slots 41 as shown in FIG. 11 due to air pressure generated by the rotation of the rotating plate R, so as to form a herringbone pattern having the plurality of air guide grooves M.

While the present invention has been particularly shown and described with reference to embodiments thereof, it will be understood by one of ordinary skill in the art that various changes in form and details may be made therein without departing from the scope of the present invention as defined by the following claims.

The invention claimed is:

1. A foil air bearing for sustaining a load of a rotor rotating in a predetermined rotation direction around a center line, the foil air bearing comprising:
   an upper top foil disposed to face a surface of the rotor;
   a middle top foil disposed under the upper top foil;
   a lower top foil disposed under the middle top foil;
   a bump foil provided as an elastically deformable member and disposed under the lower top foil; and
   a plurality of slots provided as holes penetrating from an upper surface to a lower surface of the middle top foil, and extending along a lengthwise direction forming a predetermined angle with a rotation direction of the rotor,
   wherein the upper top foil is deformed in a downward concave shape at locations corresponding to the slots due to air pressure generated by rotation of the rotor, so as to form a herringbone pattern.

2. The foil air bearing of claim 1, wherein the plurality of slots are spaced apart from each other by a predetermined distance and symmetrically disposed with respect to an imaginary line of symmetry parallel to the rotation direction.

3. The foil air bearing of claim 1, wherein a lower surface of the middle top foil and an upper surface of the lower top foil are stacked on one another and are separable.

4. The foil air bearing of claim 1, wherein the foil air bearing comprises a journal foil air bearing in which the rotor is provided in a form of a rotating shaft, and
 wherein the journal foil air bearing comprises:
 a base foil disposed to surround the bump foil; and
 a coupler for coupling ends of the plurality of top foils, one end of the bump foil, and both ends of the base foil to each other.

5. The foil air bearing of claim 1, wherein the foil air bearing comprises a journal foil air bearing in which the rotor is provided in a form of a rotating shaft.

6. The foil air bearing of claim 1, wherein the foil air bearing comprises a thrust foil air bearing in which the rotor is provided in a form of a rotating plate,
 wherein the middle top foil is provided in a form of a circular plate, and
 wherein the slots are arranged along an imaginary circle having a center corresponding to a center of the circular plate.

* * * * *